Aug. 4, 1931.  W. N. BOOTH  1,816,926
WIRE WHEEL
Filed June 25, 1928  2 Sheets-Sheet 1
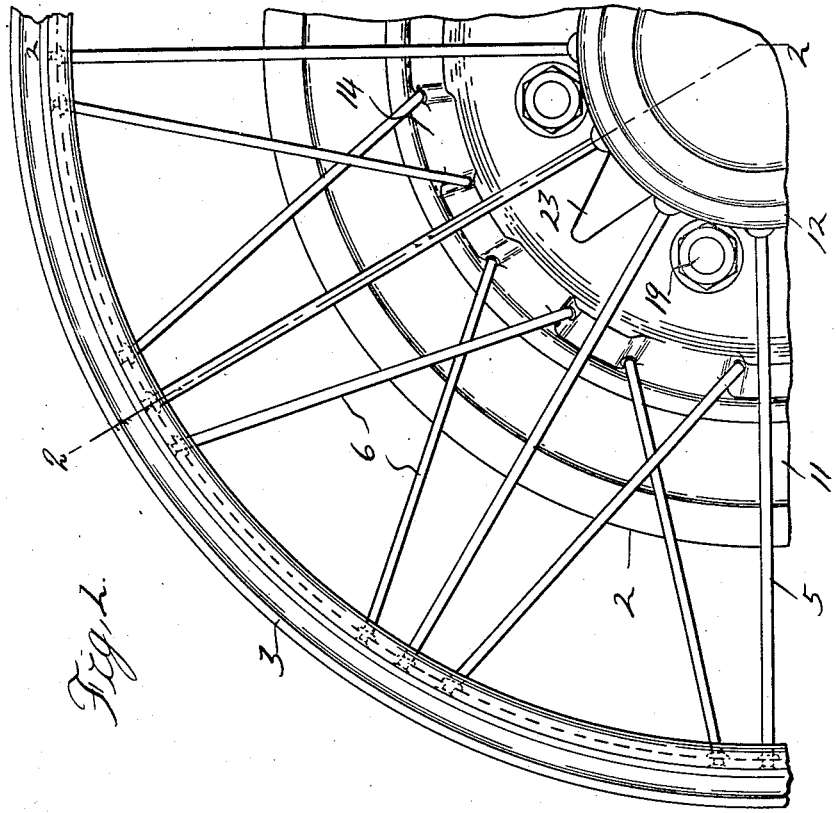
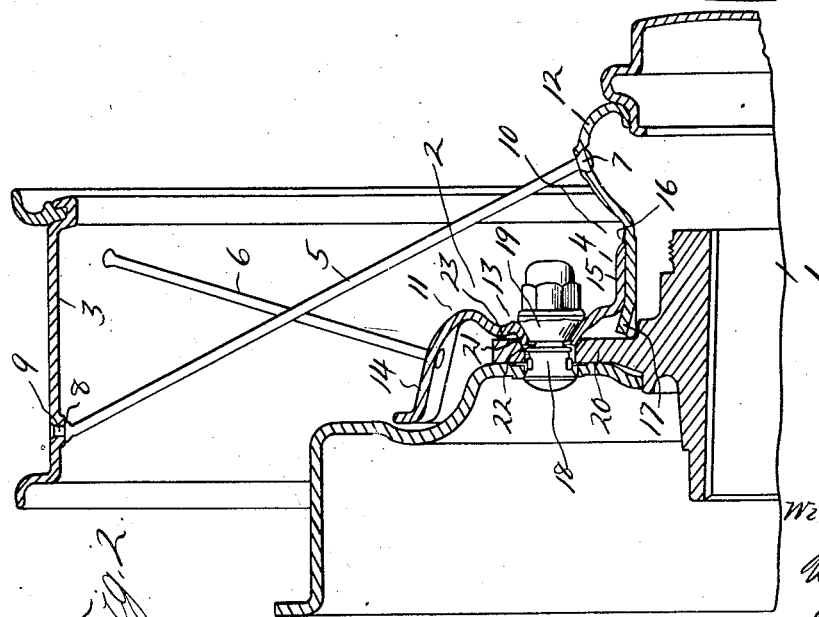
INVENTOR
William N. Booth
By Whittemore Hulbert
Whittemore Belknap
ATTORNEYS Aug. 4, 1931.  W. N. BOOTH  1,816,926
WIRE WHEEL
Filed June 25, 1928   2 Sheets-Sheet 2

INVENTOR
William N. Booth
BY
ATTORNEYS

Patented Aug. 4, 1931

1,816,926

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WIRE WHEEL

Application filed June 25, 1928. Serial No. 288,194.

The invention relates to wire wheels designed particularly for use with motor vehicles and more particularly refers to wire wheels of the demountable type for use with automobiles. One of the objects of the invention is to so construct the outer hub member that it may be manufactured at relatively low cost. Another object is to so secure the outer hub member to the inner hub member that the inner hub member offers a stop for the rear end of the barrel section forming part of the outer hub member. With these as well as other objects in view, the invention resides in the novel features of construction and combinations and arrangements of parts as more fully hereinafter set forth.

In the drawings:

Figure 1 is a front elevation of a portion of a vehicle wheel, embodying my invention;

Figure 2 is a cross section on the line 2—2 of Figure 1;

Figure 3:
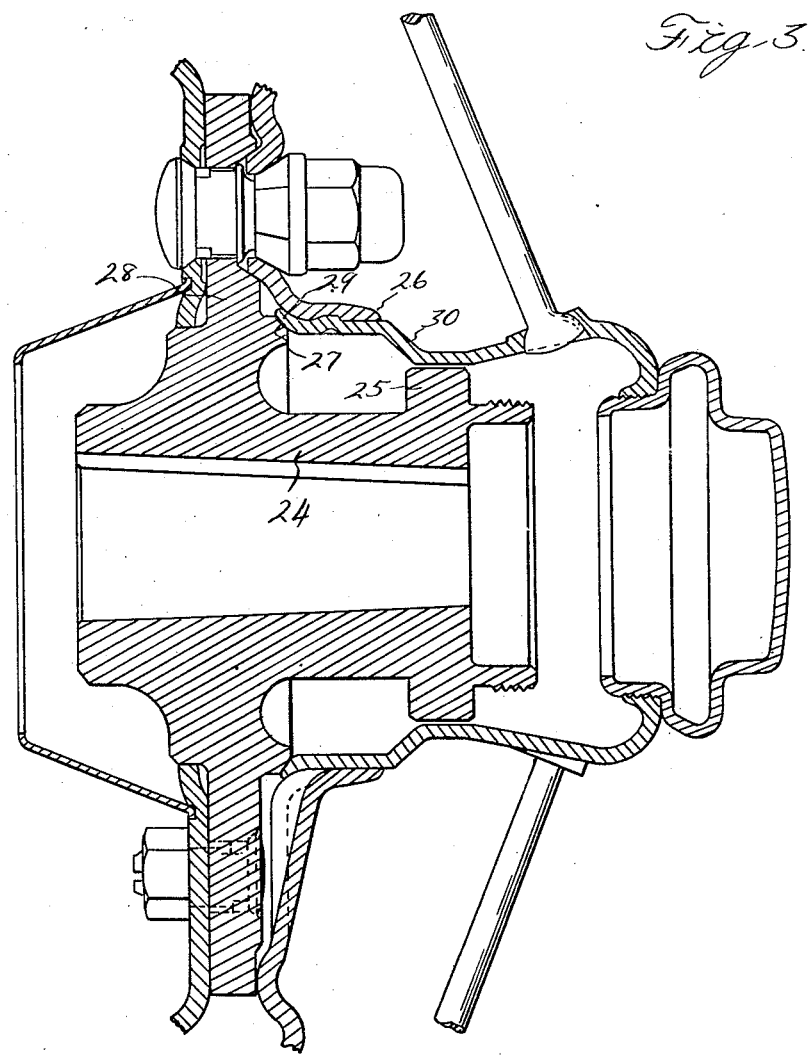
Figure 3 is a cross section similar to Figure 2, showing a modification.

The wire wheel is a suspension wire wheel designed particularly for use with automobiles. As shown in Figures 1 and 2, the wheel has the inner hub member 1 and the wheel body 2, which is adapted to be detachably mounted upon the inner hub member. The wheel body comprises the sheet metal rim member 3, the outer hub member or hub shell 4 and sets of front and rear spokes 5 and 6, respectively, extending between and connecting the rim member and outer hub member. These spokes have the heads 7 at their inner ends and the enlargements 8 near their outer ends providing shoulders at fixed distances apart for respectively engaging the inner faces of the outer hub member and rim member. The spokes also have the tenons 9 extending radially through the rim member and riveted over against its outer face to form other shoulders for securing the spokes to the outer rim member. The outer hub member is formed of sheet metal and its spoke engaging portions, as well as the spoke engaging portions of the rim member, are die-formed so that they are accurately located.

The outer hub member 4 comprises the barrel and flange sections 10 and 11, respectively, which are pressed to shape from sheet metal blanks. The barrel section has the annular enlargement 12 at its front end in which are located the die-formed spoke engaging portions, including hemispherical seats for engaging the heads 7 upon the front spokes. The flange section has the radially extending flange portion 13, the transverse rearwardly extending flange 14 at the outer edge of the flange portion and the transverse forwardly extending annular flange 15 at the inner edge of the flange portion. The flange 14 has die-formed therein the spoke engaging portions including hemispherical seats for engaging the heads 7 at the inner ends of the rear spokes. The annular flange 15 telescopically engages the rear portion of the barrel section and is rigidly secured thereto by forming upon the barrel section the outwardly pressed annular shoulder 16 engaging the front end of the annular flange and the outwardly pressed tongues 17 at the rear end of the barrel section and forming shoulders engaging the rear end of the annular flange.

The wheel body 2 is detachably secured to the wheel hub or inner hub member by means of the bolts 18 and the nuts 19, the former extending through the fixed flange 20 upon the inner hub member and the latter engaging the flange portion 13 of the flange section 11. Specifically, this flange portion is provided with the tapered tubular driving projections 21, which are engaged by correspondingly tapered ends upon the nuts and are adapted to be forced into correspondingly tapered driving recesses or pockets 22 in the front face of the fixed flange 20. These projections and recesses also transmit the radial load upon the inner hub member to the outer hub member of the wheel body. Radially outward beyond these driving projections the flange portion is provided with the annular rib 23 adapted to be brought into contact with the front face of the fixed flange 20 near its outer edge. The rear end of the barrel section 10 is engageable with the fixed flange 20 prior to engagement of the annular rib 23 with this fixed flange and this annular rib is engageable with the fixed flange prior to engagement of the tubular driving projections 21 with their pockets. The arrangement is such that the fixed flange forms a stop engageable with the rear end of the barrel section to limit rearward movement of the outer hub member of the wheel body so that tightening up of the nuts causes flexing of the flange section and separation of the spoke engaging portions upon the barrel and flange sections in an axial direction to effect tensioning of the spokes. Furthermore, the flange section functions to assist in locking the nuts upon the bolts. Also by reason of the rear end of the barrel section being engaged to limit the rearward movement of the wheel body, liability of the flange section working loose from the barrel section while flexing the flange section is greatly lessened.

In the modification shown in Figure 3 the parts have much the same general arrangement, the main difference being that the inner hub member 24 has near the front end of its barrel portion the annular portion 25 for guiding the outer hub member or hub shell 26 while mounting the wheel body upon the inner hub member. This inner hub member further has the forwardly extending annular stop portion 27 upon its fixed flange 28, which is engageable with the outwardly pressed or turned flange 29 formed at the rear end of the barrel section 30 so that this flange will not be sprung while tightening up the securing nuts.

What I claim as my invention is:

1. In a vehicle wheel, the combination with an inner hub member, of a wheel body adapted to be mounted upon said inner hub member comprising a rim member, an outer hub member having a barrel section provided with spoke engaging portions at its front end and a flange section at the rear end of and sleeved upon and secured to said barrel section and provided with spoke engaging portions, spokes between said rim and outer hub members engaging said portions, means upon said inner hub member forming a stop for the rear end of said barrel section to limit the rearward movement of said wheel body upon said inner hub member, and means engaging said flange section for securing said wheel body to said inner hub member and separating said spoke engaging portions in an axial direction to effect tensioning of said spokes, said stop forming means being placed to cooperate with said barrel section to prevent overstressing the joint between said flange and barrel sections.

2. In a vehicle wheel, the combination with an inner hub member, of a wheel body adapted to be mounted upon said inner hub member comprising a rim member, an outer hub member having a barrel section provided with spoke engaging seats at its front end and a flange section at the rear end of and sleeved upon said barrel section and provided with spoke engaging seats, said barrel section having at its rear end an out-turned portion engaging said flange section to hold said flange section from disengagement from said barrel section, spokes between said rim and outer hub members and engaging said seats, means upon said inner hub member for engaging the rear end of said barrel section to limit the rearward movement of said wheel body upon said hub member, and means engaging said flange section for securing said wheel body to said inner hub member and separating the seats upon said barrel and flange sections in an axial direction, said barrel section engaging means upon said inner hub member being placed to cooperate with said barrel section to assist in preventing said flange section from working loose from said barrel section.

3. In a vehicle wheel, the combination with an inner hub member, of a wheel body comprising a rim member, an outer hub member having a sheet metal barrel section provided with spoke engaging seats at its front end and a sheet metal flange section at the rear end of and telescopically engaging said barrel section and provided with spoke engaging seats, said flange section having an annular flange sleeved upon said barrel section and said barrel section having an outwardly pressed portion forming a shoulder engaging the front end of said annular flange and an outwardly pressed portion at its rear end forming a shoulder engaging the rear end of said annular flange, spokes between said rim and outer hub members and engaging said seats, a flange upon said inner hub member having a portion for engaging said outwardly pressed portion at the rear end of said barrel section to limit the rearward movement of said wheel body upon said hub member, and means outwardly beyond said limiting portion and engaging said flange and flange section for securing said wheel body to said inner hub member and flexing the flange section to effect tensioning of said spokes.

In testimony whereof I affix signature.

WILLIAM N. BOOTH.